(12) United States Patent
Rahman et al.

(10) Patent No.: US 12,557,132 B2
(45) Date of Patent: Feb. 17, 2026

(54) SYSTEMS FOR PROVIDING COEXISTENCE BETWEEN CELLULAR AND WIRELESS COMMUNICATION TECHNOLOGIES

(71) Applicant: Intel Corporation, Santa Clara, CA (US)

(72) Inventors: Mahibur Rahman, Chandler, AZ (US); Amit Singhal, Bangalore (IN); Avi Turgeman, Modi'in (IN)

(73) Assignee: Intel Corporation, Santa Clara, CA (US)

( * ) Notice: Subject to any disclaimer, the term of this patent is extended or adjusted under 35 U.S.C. 154(b) by 909 days.

(21) Appl. No.: 17/561,392

(22) Filed: Dec. 23, 2021

(65) Prior Publication Data

US 2023/0209584 A1 Jun. 29, 2023

(51) Int. Cl.
*H04W 72/541* (2023.01)

(52) U.S. Cl.
CPC .................. *H04W 72/541* (2023.01)

(58) Field of Classification Search
CPC ............ H04W 16/14; H04W 72/0453; H04W 72/1215; H04W 72/541; H04W 88/06; H04W 16/10; H04W 24/02; H04W 24/08; H04W 4/80; H04W 84/12; H04W 84/18; G06F 30/27; G06N 20/00; G06N 20/10; G06N 20/20; G06N 3/02; G06N 3/042; G06N 3/045; G06N 5/022; G06N 5/04; H04B 1/713; H04B 1/7136; H04B 2001/71362; H04B 2001/7154; H04L 41/0893; H04L 41/0894; H04L 41/16; Y02D 30/70; Y04S 40/00
USPC .................................................... 455/452.1
See application file for complete search history.

(56) References Cited

U.S. PATENT DOCUMENTS

| | | | |
|---|---|---|---|
| 10,257,831 B2 * | 4/2019 | Geraci | H04B 17/345 |
| 2018/0352554 A1 * | 12/2018 | Flynn | H04W 72/1215 |
| 2020/0059941 A1 * | 2/2020 | Belghoul | H04W 72/542 |
| 2021/0153028 A1 * | 5/2021 | Li | H04W 72/23 |
| 2022/0345987 A1 * | 10/2022 | Gopal | H04W 40/16 |

* cited by examiner

*Primary Examiner* — Hirdepal Singh
(74) *Attorney, Agent, or Firm* — Schwabe, Williamson & Wyatt, P.C.

(57) ABSTRACT

Embodiments of the present disclosure are directed to providing a comprehensive and effective solution for the concurrent coexistence of cellular communications with communications in various wireless communication formats. Other embodiments may be described or claimed.

6 Claims, 10 Drawing Sheets

| Parameter | WiFi User Selection | WiFi Module with BAW Filter | Cellular HPUE Mode | Cellular TX Power Threshold (dBm) | Cellular TX Channel Bandwidth (MHz) | Aggressor Range 1 (MHz) | Aggressor Range 2 (MHz) | Aggressor Range 3 (MHz) | Aggressor Range 4 (MHz) |
|---|---|---|---|---|---|---|---|---|---|
| Band 41 Transmit Frequency Range | N/A | N/A | N/A | N/A | N/A | 2496-2500 | 2501-2520 | 2521-2570 | 2571-2690 |
| Safe Channels in 2.4 GHz WiFi Band | 2.4 GHz WiFi Band Only | yes | No | +3 dBm (+/- hysteresis) | 10 - 20 | WiFi channel 1 | WiFi channel 1 | WiFi channel 1 | WiFi channels 1 - 6 |
| Safe Channels in 2.4 GHz WiFi Band | 2.4 GHz WiFi Band Only | No | Yes | +3 dBm (+/- hysteresis) | 10 - 20 | WiFi channel 1 | WiFi channel 1 | WiFi channel 1 | WiFi channels 1 - 3 |
| Safe Channels in 2.4 GHz WiFi Band | Any WiFi Band | BAW or non-BAW | x | +3 dBm (+/- hysteresis) | 10 - 20 | WiFi channel 1 | WiFi channel 1 | WiFi channel 1 | WiFi channel 1 |
| Safe Channels in 5 GHz or 6 GHz WiFi Band | Any WiFi Band | BAW or non-BAW | HPUE or non-HPUE | N/A | 10 - 20 | Any channel | Any channel | Any channel | Any channel |

FIG. 2A-2

SYSTEMS FOR PROVIDING COEXISTENCE BETWEEN CELLULAR AND WIRELESS COMMUNICATION TECHNOLOGIES

FIELD

Embodiments of the present invention relate generally to the technical field of mitigating conflicts between cellular and wireless communication technologies.

BACKGROUND

Today, it is common for computing devices capable of cellular communication to utilize additional wireless communication formats and technologies. For example, many devices seek to provide the concurrent coexistence of cellular 5G/LTE communications with wireless communication formats such as WiFi, Bluetooth (and others). This type of operation is common in many PC laptop, tablet, and Internet-of-things (IoT) products. However, such operation often leads to various aggressor-victim cases, where a transmission from a cellular modem aggresses (or interferes with) the reception of signals by another (victim) modem in the same device and using a wireless communication format such as WiFi. Embodiments of the present disclosure address these and other issues.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 2A-1 is an example of a flow diagram directed to a mitigation solution for conflicts where a cellular band is adjacent to a band for a wireless communication format in accordance with various embodiments of the present disclosure.

FIG. 2A-2 is an example of a lookup table in accordance with various embodiments of the present disclosure.

DETAILED DESCRIPTION

Figure 1:
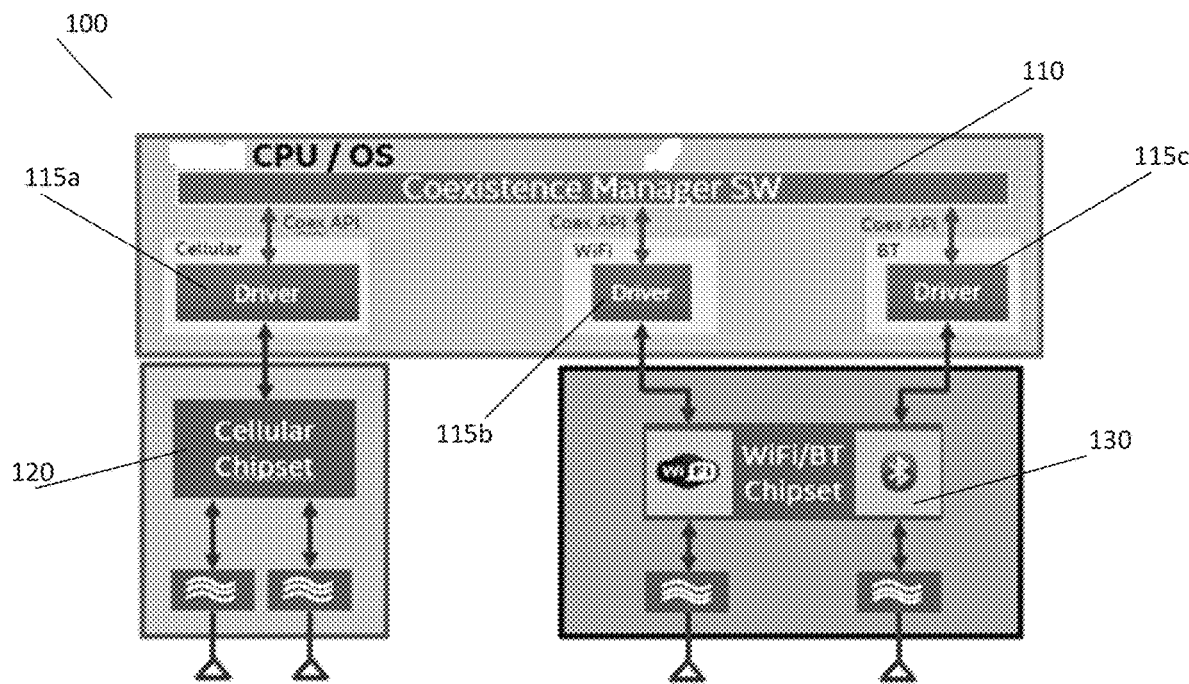
FIG. 1 illustrates an example of a platform implementing a coexistence manager in accordance with various embodiments of the present disclosure.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B). In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

The terms "substantially," "close," "approximately," "near," and "about," generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

As used herein, the term "circuitry" may refer to, be part of, or include an Application Specific Integrated Circuit (ASIC), an electronic circuit, a processor (shared, dedicated, or group), a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

As introduced above, embodiments of the present disclosure help provide a comprehensive and effective solution for the concurrent coexistence of cellular communications (e.g., 5G/LTE) with communications in various wireless communication formats (e.g., Bluetooth, Bluetooth low energy (BLE), radio frequency identification (RFID), Wi-Fi, ZigBee, Z-Wave, etc.) within the same product.

In particular, embodiments of the present disclosure help provide solutions for concurrent operation of these wireless communication technologies while maintaining a network connection and maximizing the user experience. This includes maximizing both the receiver sensitivity and also the link throughput performance experienced by the user across the indicated wireless connectivity solutions (5G/LTE and WiFi/Bluetooth) under any operating condition. Some embodiments may be used to effectively address problematic adjacent aggressor-victim band cases as well as cases where harmonics and/or intermodulation products due to one or more transmitters can victimize a given receiver.

It should also be noted that the 5G/LTE with WiFi/Bluetooth coexistence problem has recently been further exacerbated due to the introduction of cellular HPUE (High Power User Equipment) operating mode. This operation allows cellular transmit power levels to reach an even higher +26 dBm power level for a number of 5G and LTE bands including those directly adjacent or in close proximity of WiFi/Bluetooth bands.

Embodiments of the present disclosure provide a number of advantages over conventional systems. For example, embodiments of the present disclosure provide a scalable coexistence solution to support any cellular, WiFi, and Bluetooth modem (as well as other wireless communication formats).

This disclosure proceeds by providing solutions to various use cases challenging the coexistence of cellular communications with other wireless communication formats.

For example, in situations where a cellular band is adjacent to a band for another wireless communication format (e.g., WiFi/Bluetooth), embodiments of the present disclosure can select safe (e.g., WiFi and Bluetooth) operating channels based on platform level performance characterization of user experienced metrics (e.g., receiver sensitivity, throughput, etc.) under various actual operating conditions (e.g., cellular/WiFi/Bluetooth RF channel, RF band, channel bandwidth, transmit power, isolation between antennas, operating mode, etc.). As used herein, "adjacent" bands refers both to bands immediately adjacent to each other, as well as to bands within suitable proximity to each other where an aggressor/victim conflict may occur.

For situations where the harmonics of a cellular transmitter can victimize number of wireless communication format (e.g., WiFi/Bluetooth) channels (and vice versa), an analytical algorithm is provided for the selection of safe (e.g., WiFi and Bluetooth) channels based on the operating bands, frequencies, and channel bandwidths of the cellular modem with respect to the modem(s) for the other wireless communication formats (e.g., WiFi, and Bluetooth).

For cases where intermodulation (IMD) products with two or more cellular and/or wireless communication format (e.g., WiFi) transmitters can victimize a given cellular or wireless communication format (e.g., WiFi/Bluetooth) receiver, an analytical algorithm is provided for the selection of safe (e.g., WiFi and Bluetooth) channels based on the operating bands, frequencies, and channel bandwidths of the cellular modem with respect to the modem(s) for the other wireless communication formats (e.g., WiFi, and Bluetooth).

For cases when the network infrastructure requests concurrent operation of cellular communications and a wireless communication format within the same band (e.g., cellular and WiFi within the same 5 GHz (LAA) unlicensed operating band), a band/channel selection process or a cellular CQI (Channel Quality Indicator to cellular base station) modification scheme is used to avoid concurrent operation of the cellular communications and wireless communication format within the same band.

Among other things, the end user experience on some platforms can be maximized using embodiments of this disclosure whenever both cellular modems and modems for alternate wireless communication formats are concurrently active. This capability is important for consumer PC laptop and tablet products as well as for IoT gateway, router, and edge compute products. Without this solution, it can lead to either connection drops or significantly degraded throughput when, for example, using cellular and WiFi/Bluetooth wireless connection technologies simultaneously within the same device. In addition, the coexistence solutions described herein are scalable to use any suitable cellular or wireless communication format (including WiFi, and Bluetooth) modem, thus enabling concurrent operation among these communication technologies.

Embodiments of the present disclosure are described herein with specific reference to cellular, WiFi, and Bluetooth RF spectrums. However, embodiments of the present disclosure are not restricted to any particular wireless communication format or technology, and may operate in conjunction with any suitable number or type of such formats. For example, some embodiments may be utilized in cases where cases where a cellular transmitter is an "aggressor" that victimizes a receiver for a wireless communication format such as WiFi or Bluetooth by transmitting and interfering in the victim's band. In other embodiments, the transmitter for the wireless communication format could be the aggressor to a victim cellular receiver.

As described in more detail below, some examples of cases where embodiments of the present disclosure can help mitigate such aggressor/victim relationships include: adjacent cellular-WiFi/Bluetooth band cases; harmonics of cellular transmitters (at 2*Ftx, 3*Ftx) victimizing WiFi receivers and vice versa (where Ftx is the center frequency of the transmit aggressor channel); intermodulation products due to multiple cellular and/or WiFi transmitters (at F1+/−F2, 2*F1+/−F2) victimizing WiFi and/or cellular receivers (where F1 and F2 are center frequencies of two transmitting cellular and/or WiFi channels); and concurrent operation of cellular LAA (Band 46) with 5 GHz WiFi operation within the same operating band when scheduled by the respective networks.

FIG. 1 illustrates an example of a high level platform where a coexistence manager software solution resides in the host CPU software. In this example, the coexistence manager software (SW) 110 solution interacts with the cellular chipset 120 and WiFi/Bluetooth chipset 130 via their respective modem drivers 115a, 115b, 115c to receive dynamic system operating conditions and parameters from the respective modems (e.g., active receive/transmit channels, bands, channel bandwidths, transmit power levels, etc.). Based on these operating parameters and pre-characterized cellular-WiFi antennas isolation and transmit power thresholds, the coexistence manager 110 can select safe WiFi and Bluetooth operating channels that avoid any significant desensitization of WiFi/Bluetooth and cellular receivers.

Figures 1, 2A:
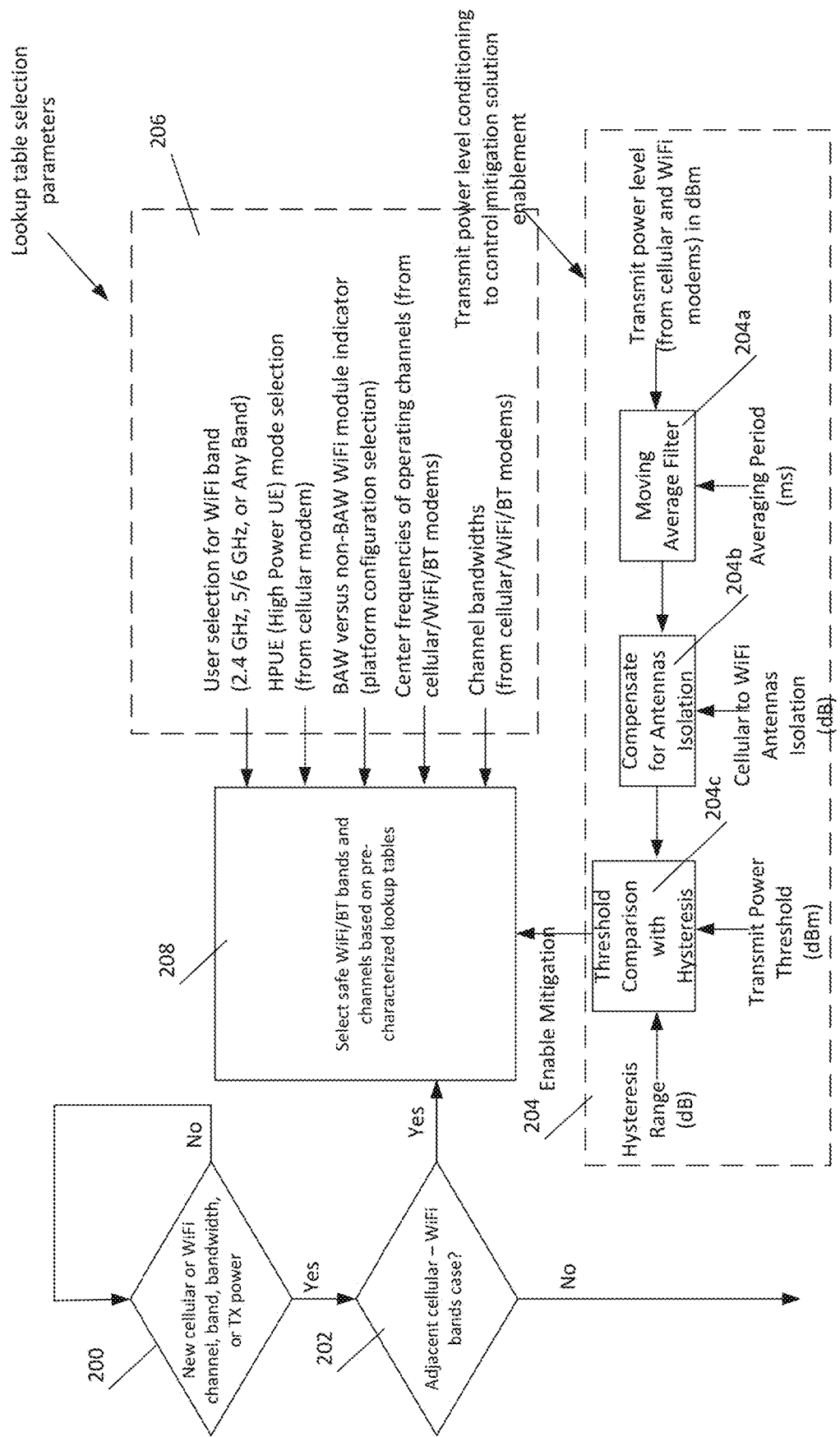

FIG. 2A illustrates an example of a process for addressing adjacent bands, namely adjacent cellular-WiFi band cases. For example, the cellular transmitter can be an aggressor to the WiFi/Bluetooth receiver as a victim, or vice versa. The worst case situations may occur when the cellular transmitter is the aggressor since the transmit power can be relatively high, such as +23 dBm (for non-HPUE mode) and as high as +26 dBm (for HPUE mode). The +/−1 dB tolerance allowed at the maximum power level further exacerbates this situation. Note that the WiFi victim receiver sensitivity level is typically at around −92 dBm (for 6.5 Mbs rate). Thus, embodiments of the present disclosure seek to limit the WiFi sensitivity degradation to less than 5 dB whenever possible.

In one specific example of adjacent cellular/WiFi band conflict, consider a 2.4 GHz band WiFi receiver with a cellular Band 7 aggressor with transmit center frequency at 2515 MHz. In this example, only a portion of the possible available WiFi channels (e.g., only WiFi channels 1-8 in the 2.4 GHz band) may be considered safe where sensitivity degradation is considered to be insignificant (<5 dB) while achieving the maximum packet success rate (>90%). Other channels, however, (e.g., channels 9-13) may be marked as unsafe for this use case based on the higher amounts of receiver desensing observed (e.g., >5 dB). Embodiments of the present disclosure may utilize a lookup table-based solution can be used for adjacent cellular-WiFi band cases with knowledge of the transmit aggressor and victim receiver frequency ranges (including channel bandwidth of the aggressor).

FIG. 2A-1 illustrates an example of a flow diagram for a mitigation process for adjacent cellular-WiFi/Bluetooth band cases. In this example, the mitigation process is triggered whenever there is a change in operating conditions (200) (e.g., cellular/WiFi band, channel bandwidth, transmit power) while an adjacent cellular-Wifi band case is detected (202). In addition, the indicated mitigation solution may be applied only when an aggressor's transmit power level exceeds a pre-characterized transmit power threshold value for a given adjacent bands case (204). The transmit power from the cellular/WiFi modem is also conditioned by averaging through a moving average filter (204a) prior to comparing to the transmit power threshold with hysteresis support (204c) to avoid chatter in the dynamic selection of safe WiFi/Bluetooth channels.

As illustrated in FIG. 2A-1, the averaged transmit power is further conditioned by compensating for the actual end-product's measured isolation between the cellular and WiFi antennas (204b). For example, if a coexistence platform level pre-characterization is performed using a default 14 dB antennas isolation while a given customer's end product achieves 20 dB antennas isolation, the TX_PWR_TH (derived from a characterization) may be biased lower by 6 dB to compensate for the improvement in isolation. In other words, TX_PWR_TH can be appropriately compensated and set based on the following equation: TX_PWR_TH (dBm)=TX_PWR_TH_CHAR (dBm)+ANT_ISO_CUST (dB)−ANT_ISO_CHAR (dB), where the input parameters are specified as follows:

TX_PWR_TH_CHAR (dBm)=Highest TX_PWR_TH value from characterization results based on the currently active adjacent cellular bands (i.e., bands 7, 30, 38, 40, 41, n77, n79) that is communicated to IDC manager from the cellular modem.

ANT_ISO_CUST (dB)=cellular-to-WiFi antennas isolation measured by customer for end product and specified through a customer user API (configurable in the ODM factory).

ANT_ISO_CHAR (dB)=cellular-to-WiFi antennas isolation used during coexistence RF characterization.

Figure 4:
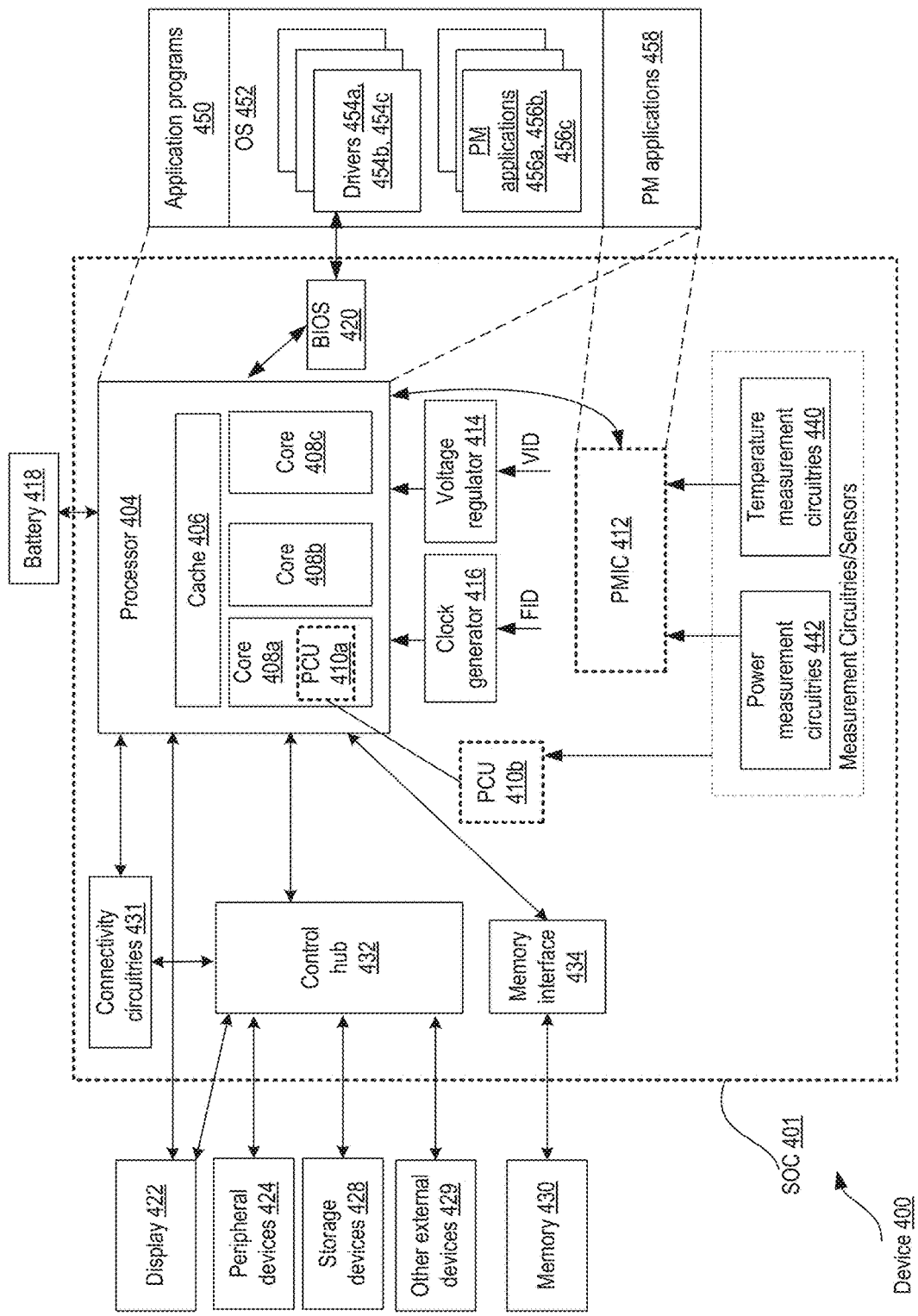
FIG. 4 illustrates an example of a smart device, computer system, or a System-on-Chip (SoC) that may implement one or more processes described herein in accordance with some embodiments.

The "lookup table selection parameters" (206) in FIG. 2A-1 comprise examples of system operating parameters associated with communication by an apparatus (e.g., a computing device such as illustrated in FIG. 1 or 4) in a cellular band concurrent to a communication by the computing device in a wireless communication format (WiFi or Bluetooth in this example) using a band adjacent to the cellular band.

The "transmit power level conditioning to control mitigation solution enablement" section illustrates an example of determining whether a transmit power level associated with the communication in the cellular band, or a transmit power level associated with the communication in the wireless communication format, exceeds a predetermined threshold.

In FIG. 2A-1, if mitigation is enabled, the coexistence manager 110 selects (208), based on the system operating parameter(s) and the determination that the transmit power level exceeds the predetermined threshold, a band and channel for the communication in the wireless communication format that avoids interference with the communication in the cellular band. The system may then encode a message for transmission in the wireless communication format using the selected band and channel.

As noted above, while examples of the wireless communication formats potentially conflicting with cellular communications are provided with reference to WiFi and Bluetooth, embodiments of the present disclosure may operate in conjunction with any suitable wireless communication format, including Bluetooth low energy (BLE), radio frequency identification (RFID), ZigBee, or Z-Wave.

When the mitigation solution in FIG. 2A-1 is triggered based on the conditions discussed earlier (adjacent cellular-WiFi bands case and transmit power threshold being exceeded), pre-characterized lookup tables based on platform level characterization of user experienced performance metrics may be used to select safe WiFi and Bluetooth bands and channels. Lookup table input parameters may include, for example, operating channel frequencies, channel bandwidths, High Power UE (HPUE) operating mode, WiFi user band selection, and type of WiFi module used (BAW/non-BAW). An example of one such lookup table is shown in FIG. 2A-2.

In the example in FIG. 2A-2, the lookup table is associated with a cellular transmit aggressor in Band 41 (2496-2690 MHz) with a 2.4 GHz WiFi band victim (2400-2496 MHz). Note that Band 41 is used in this example since it supports both HPUE and non-HPUE operating modes in addition to being a band directly adjacent to 2.4 GHz WiFi band. By utilizing the lookup table, the coexistence manager 110 selects safe channels in 2.4 GHz and 5 GHz WiFi bands while taking into account the WiFi user selection for the WiFi band (i.e., "2.4 GHz WiFi only" or "any WiFi band" operation).

Next, the HPUE (High Power UE) mode selection by the network is taken into account by the coexistence manager 110. When HPUE mode is not selected, the maximum cellular transmit power is limited to +23 dBm for a given band. In this situation based on our RF pre-characterization, there are no safe WiFi channels (i.e, with <5 dB receiver desense) when the cellular transmit aggressor is in 2496-2570 MHz frequency range (aggressor ranges 1-3) of Band 41 and the transmit power threshold indicated (with hysteresis) is exceeded. In such a case if the WiFi user selection is 2.4 GHz band operation only, the default channel 1 will be selected for this case since it is the furthest channel from cellular Band 41 aggressor and hence will cause the lowest amount of WiFi receiver desense. Alternately, when the cellular transmit aggressor is in the 2571-2690 MHz frequency range (aggressor range 4) of Band 41 and the transmit power threshold (with hysteresis) is exceeded, WiFi channels 1-5 may be considered safe based on the amount of measured WiFi receiver desense measured for this case (e.g., <5 dB desense).

The second use case indicated in FIG. 2A-2 is when cellular Band 41 is selected to operate in a network supporting HPUE mode, which means supporting an even higher maximum transmit power of up to +26 dBm. Similar to the previous case, there are no safe WiFi channels (e.g., with <5 dB receiver desense) when the cellular transmit aggressor is in 2496-2570 MHz frequency range of Band 41 and the transmit power threshold (with hysteresis support) is exceeded. In addition, when the cellular transmit aggressor is in the 2571-2690 MHz frequency range, only WiFi channels 1-2 are safe (when transmit power threshold is exceeded). In this case, the number of safe available WiFi channels is further limited since the cellular HPUE transmitter's maximum power can be up to 3 dB higher versus non-HPUE mode.

The lookup table solution also accounts for the channel bandwidth of the cellular aggressor. This example table is for the case of cellular transmit channel bandwidth is in the 10-20 MHz range. In the case of lower 1.4-5 MHz channel bandwidths, the number of safe WiFi channels in aggressor range 4 may be further increased since the aggressor's spectral re-growth is further limited for this case (versus higher channel bandwidths case).

Figure 2B:
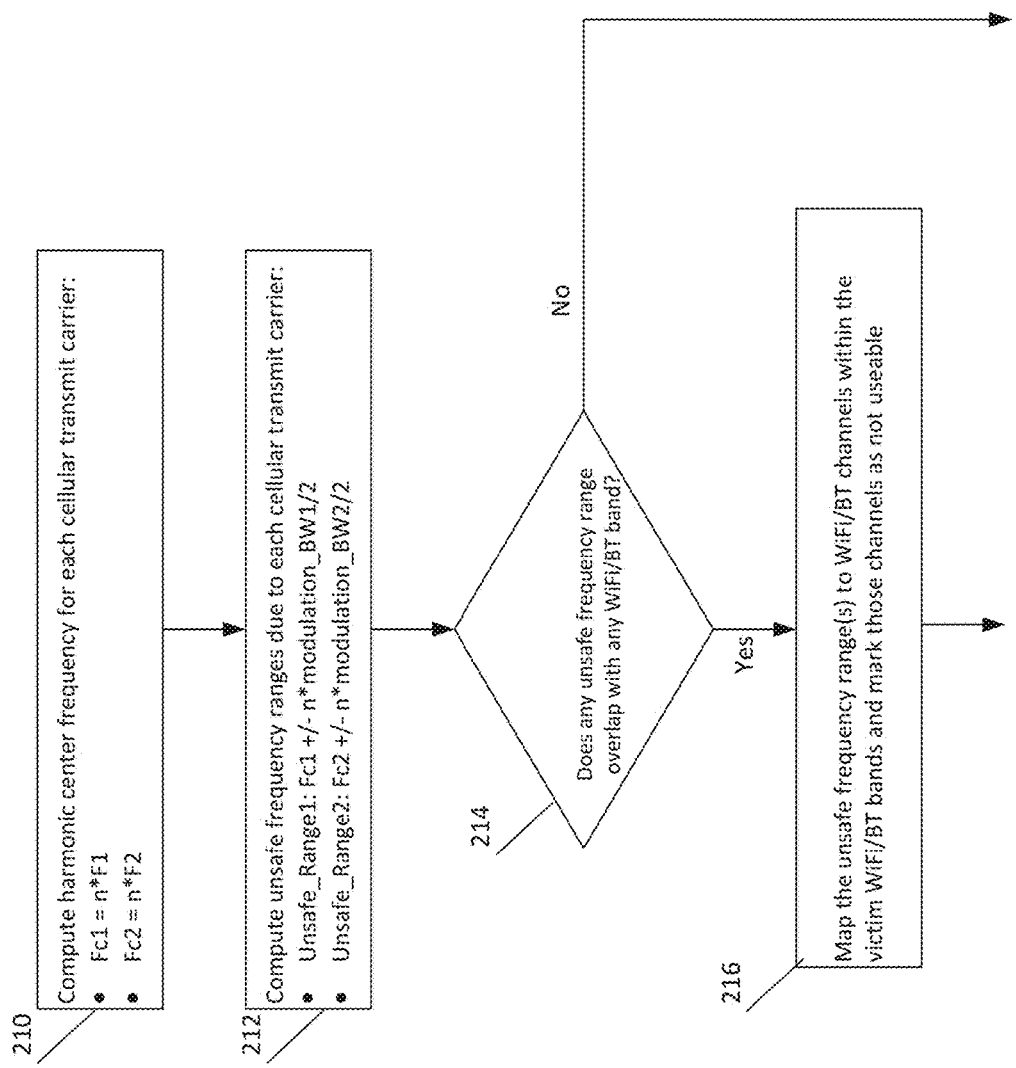
FIGS. 2B, 2C, 2D, 3A, 3B, and 3C are flow diagrams showing examples of processes for mitigating communication conflicts in accordance with various embodiments of the present disclosure.

FIG. 2B illustrates an example of a flow diagram for a process for mitigating harmonic cases. For example, where either the 2nd or 3rd harmonic of a cellular transmit carrier directly lands in a WiFi band, the coexistence solution must not select WiFi channels in the victim frequency ranges of the harmonic terms. This is due to cellular transmit power levels up to +26 dBm (HPUE) and also because of limited harmonic filtering after the PA (Power Amplifier) in the cellular transmit signal paths for a number of bands.

In the example illustrated in FIG. 2B, the process computes a harmonic center frequency for each cellular transmit carrier (210) and determines unsafe WiFi/Bluetooth frequency ranges (212) based on the active transmitter center frequencies, channel bandwidths, and order of transmitter harmonics. If the computed unsafe frequencies overlap with any frequency range within the WiFi bands (214) (e.g., 2.4 GHz, 5 GHz, and 6 GHz bands), the WiFi channels associated with these frequency ranges are marked as not usable by the coexistence manager solution (216).

The terms used in FIG. 2B are as follows:
F1, F2=center frequencies of two cellular transmit aggressor carriers;
n=order of harmonic (either two or three);
modulation_BW1=0.9*channel bandwidth of F1 cellular transmit aggressor; and
modulation_BW2=0.9*channel bandwidth of F2 cellular transmit aggressor.

While two cellular transmit aggressor carriers are shown in the example illustrated in FIG. 2B, embodiments of the present disclosure may operate with more or fewer (i.e., a single carrier) carriers. For example, the coexistence manager 110 may determine a harmonic center frequency for a single cellular transmit carrier and determine, based on the harmonic center frequency, an unsafe frequency range in which there is conflict between a communication by the computing device in a cellular band concurrent to a communication by the computing device in a wireless communication format such as Bluetooth or Wifi. The coexistence manager 110 may accordingly map the unsafe frequency range to corresponding channels associated with the wireless communication format to mark the corresponding channels (as described above for WiFi) as unusable for the communication in the wireless communication format.

Similarly, the example in FIG. 2B illustrates determine respective first and second harmonic center frequencies for respective first and second cellular transmit carriers, and determining the unsafe frequency range based on the first harmonic center frequency and the second harmonic center frequency, marking the unusable channels accordingly. The system may then encode a message for transmission in the wireless communication format (WiFi in this example) using a channel that is not marked unusable. While two cellular transmit carriers are illustrated here, it should be noted that embodiments of the present disclosure may operate in conjunction with any suitable number of cellular transmitters.

Figure 2C:
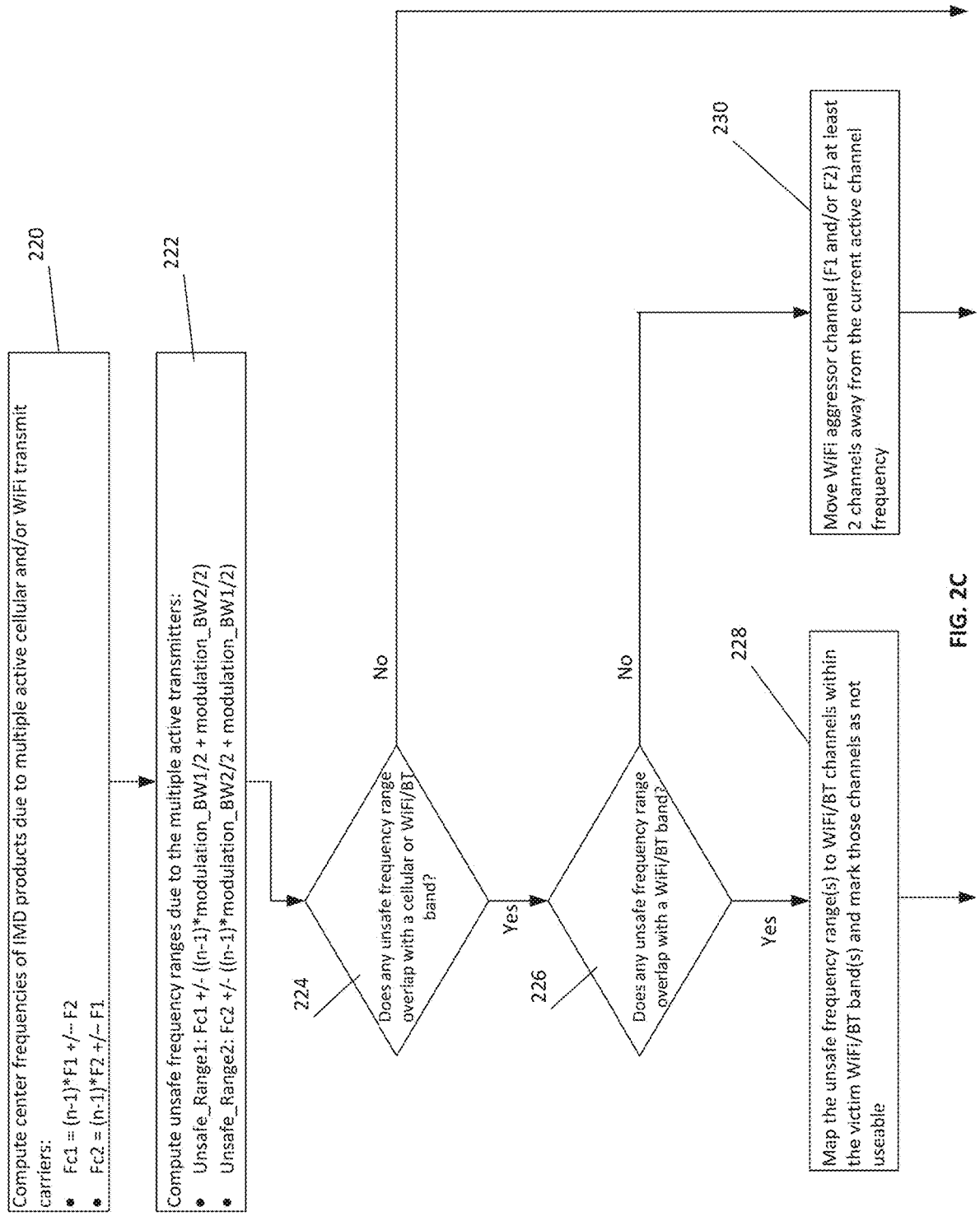

FIG. 2C illustrates an example of a flow diagram providing a solution for intermodulation cases. For example, there are cases where 2nd or 3rd order intermodulation terms due to two active cellular transmitters can victimize WiFi channels (and vice versa). This issue is further exacerbated with cellular transmit power levels of up to +26 dBm (HPUE) and also due to limited linearity performance (IIP2/IIP3) within individual stages of modem receive and transmit lineups. It should be noted that the analytical solutions of the embodiments of this disclosure can also be extended to higher order intermodulation products also (e.g., fourth, fifth, or even higher order intermodulation terms).

As illustrated in FIG. 2C, the coexistence manager 110 determines center frequencies for intermodulation (IMD) products (220) and determines unsafe frequency ranges (222) based on the active transmitter center frequencies, channel bandwidths, and intermodulation orders. If the computed unsafe frequencies overlap with any frequency range within a WiFi band (226) (e.g., 2.4 GHz, 5 GHz, and 6 GHz bands), the WiFi channels associated with these frequency ranges are marked as not usable (228) by the coexistence manager 110. Alternately, if the unsafe frequency ranges overlap with any cellular band receive frequencies (224), one of the aggressor WiFi channels is requested to move at least 2 channels away from the current operating channel (230) to avoid cellular receiver desensitization.

The terms used in FIG. 2C are as follows:
F1, F2=center frequencies of the two cellular aggressor carriers;
modulation_BW1=0.9*channel bandwidth of F1 cellular aggressor;
modulation_BW2=0.9*channel bandwidth of F2 cellular aggressor; and
n=intermodulation product order (i.e., values of 2 and 3 for 2nd and 3rd order IMD distortion product, respectively).

While two cellular aggressor carriers are illustrated in the example shown in FIG. 2C, embodiments of the present disclosure may determine center frequencies for any suitable number of cellular transmit carriers or carriers for a wireless communication format (such as WiFi or Bluetooth) associated with communications by a computing device. The coexistence manager 110 may determine, based on the determined center frequencies, an unsafe frequency range in which there is conflict between a communication by the computing device in a cellular band concurrent to a communication by the computing device in the wireless communication format. As noted above, in the event that the unsafe frequency range overlaps with the cellular band, the computing device may communicate using the wireless communication format in a channel that is at least two channels away from an active channel frequency of the cellular band.

Alternatively, in the event that the unsafe frequency range overlaps with a band used for the communication in the wireless communication format, the coexistence manager 110 may map the unsafe frequency range to corresponding channels associated with the wireless communication format to mark the corresponding channels as unusable for the communication in the wireless communication format. The computing device may then encode a message for transmission in the wireless communication format using a channel that is not marked unusable.

Figure 2D:
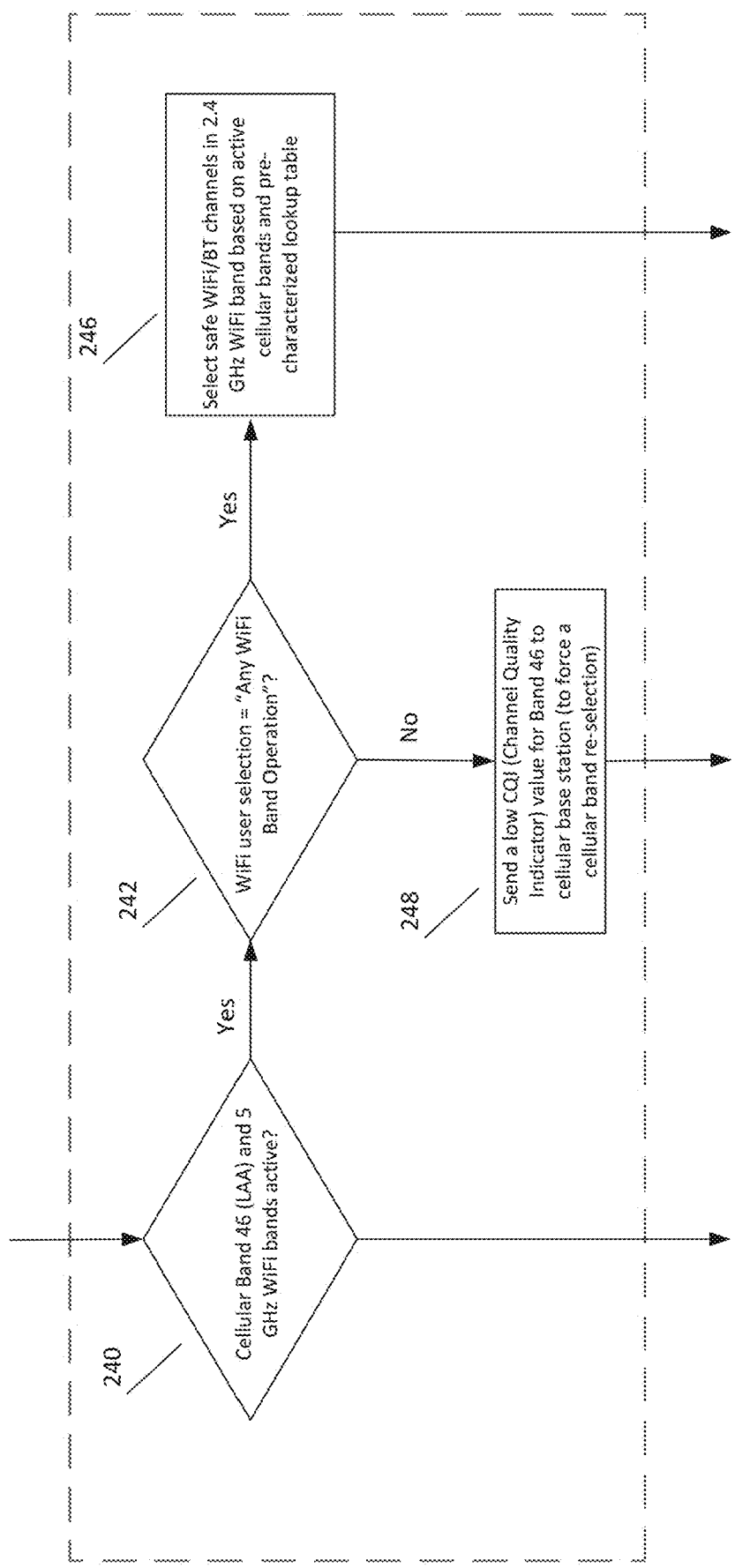

FIG. 2D illustrates an example of a flow diagram for a mitigation process where a computing devices receives, from a network, a request to for the computing device to perform a communication in a cellular band concurrent to performing a communication, by the computing device, in a wireless communication format (such as WiFi) and the communication in the wireless communication format is to be performed within the cellular band 240. The specific example depicted in FIG. 2D is directed to a license assisted access (LAA) cellular band, namely Cellular Band 46, with 5 GHz WiFi Band operation being requested by a network.

As illustrated in FIG. 2D, the coexistence manager 110 may, in response to receiving the request, either: select, based on the cellular band, a channel for the communication in the wireless communication format that is outside the cellular band (246); or encode a low channel quality indicator (CQI) message for transmission to a next-generation NodeB (gNB) to force a cellular band reselection (248).

Accordingly, the coexistence manager 110 first checks if any WiFi band can be used based on the WiFi user selection (242). If any WiFi band can be used, the coexistence manager 110 forces WiFi operation within the 2.4 GHz WiFi band (246). In addition, a pre-characterized lookup table based solution may be used to select safe channels within that band for cases where there is also a secondary cellular carrier operating in a cellular band adjacent to the 2.4 GHz WiFi band.

Alternately, when the WiFi user selection is 5 GHz WiFi band operation only, the cellular modem is instructed to send a low CQI value to the gNB/eNB (cellular base station) to prevent concurrent operation of LAA with 5 GHz WiFi within the same operating band (248).

Figure 3A:
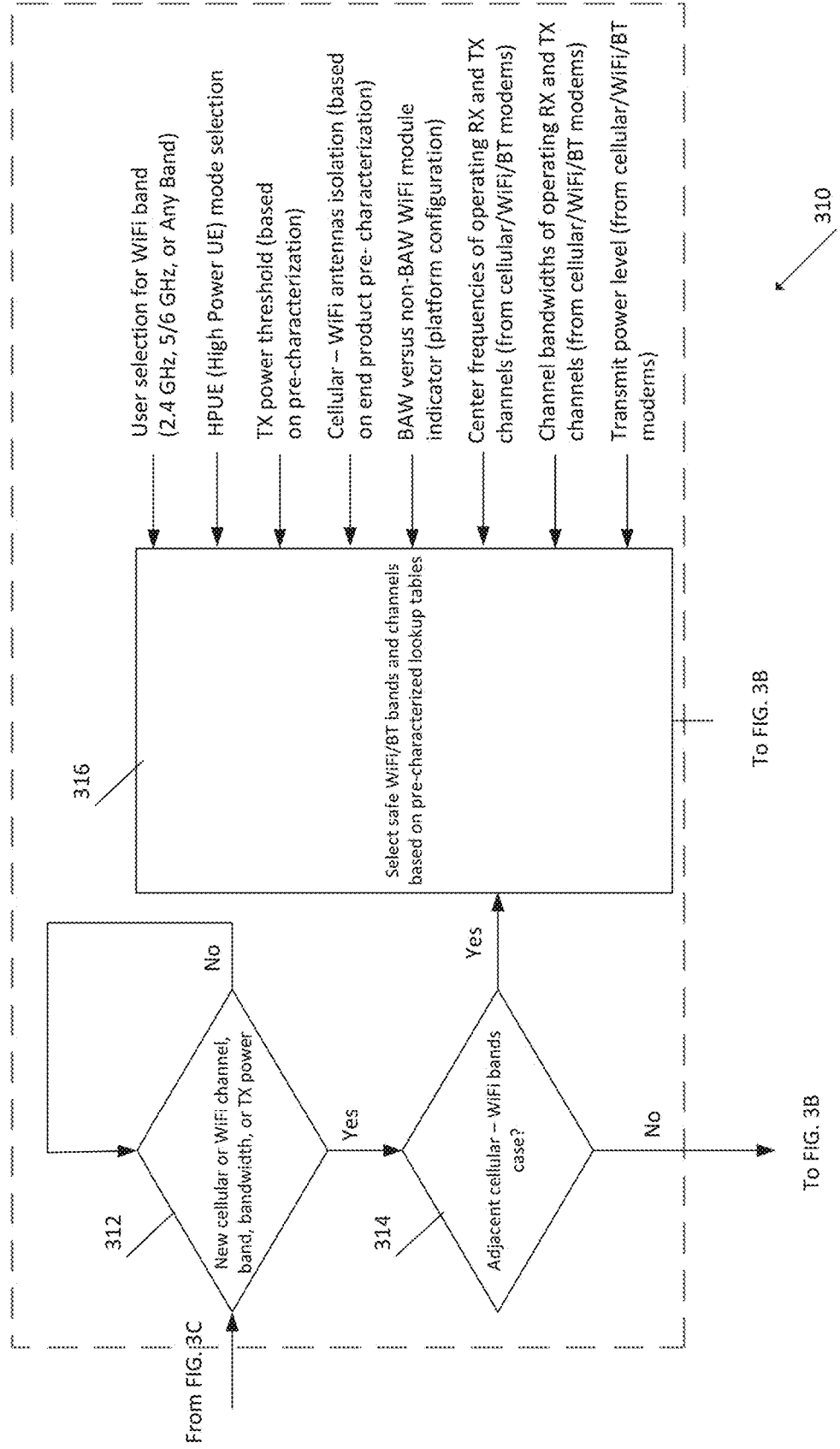
Figure 3B:
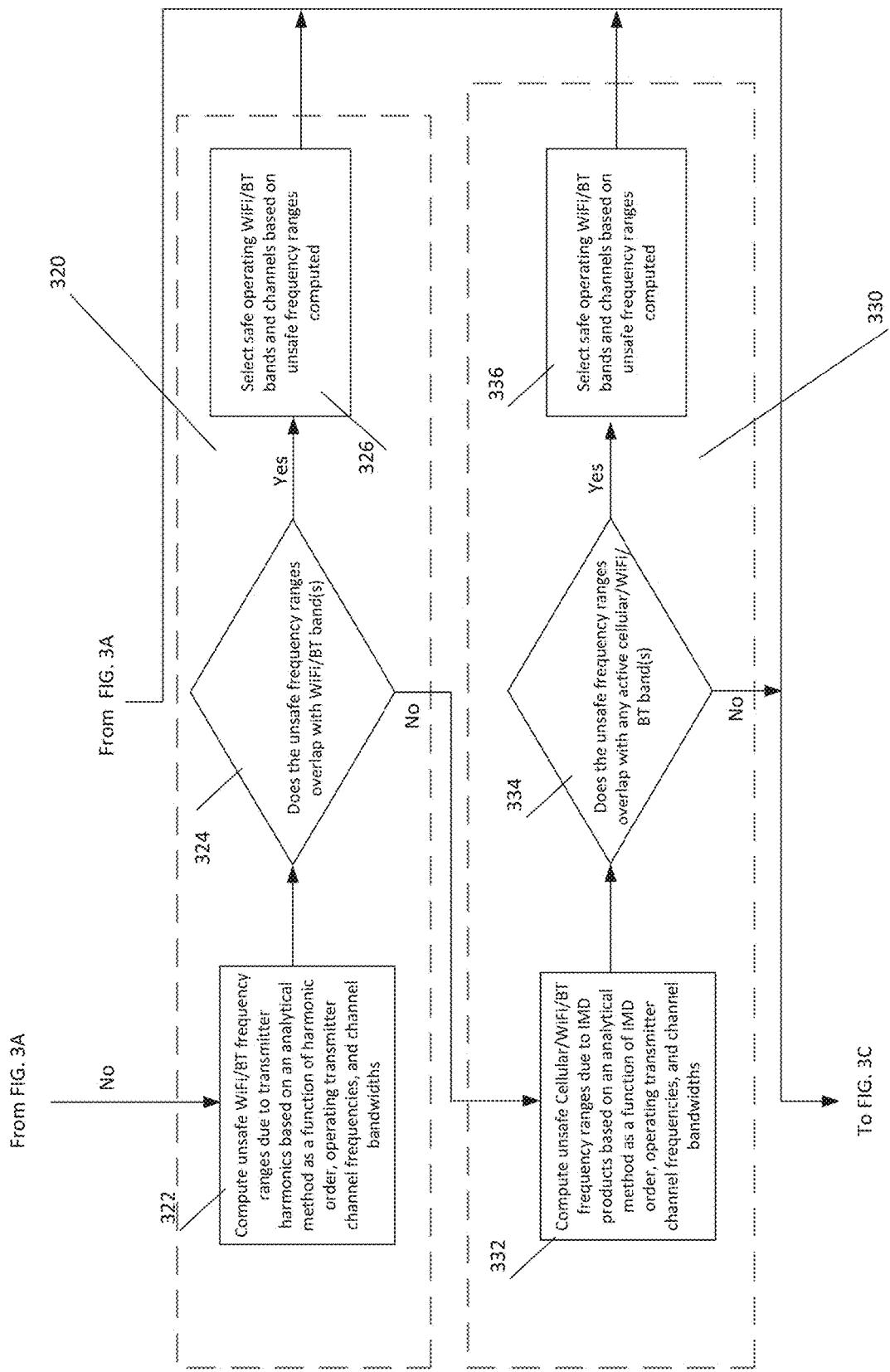
Figure 3C:
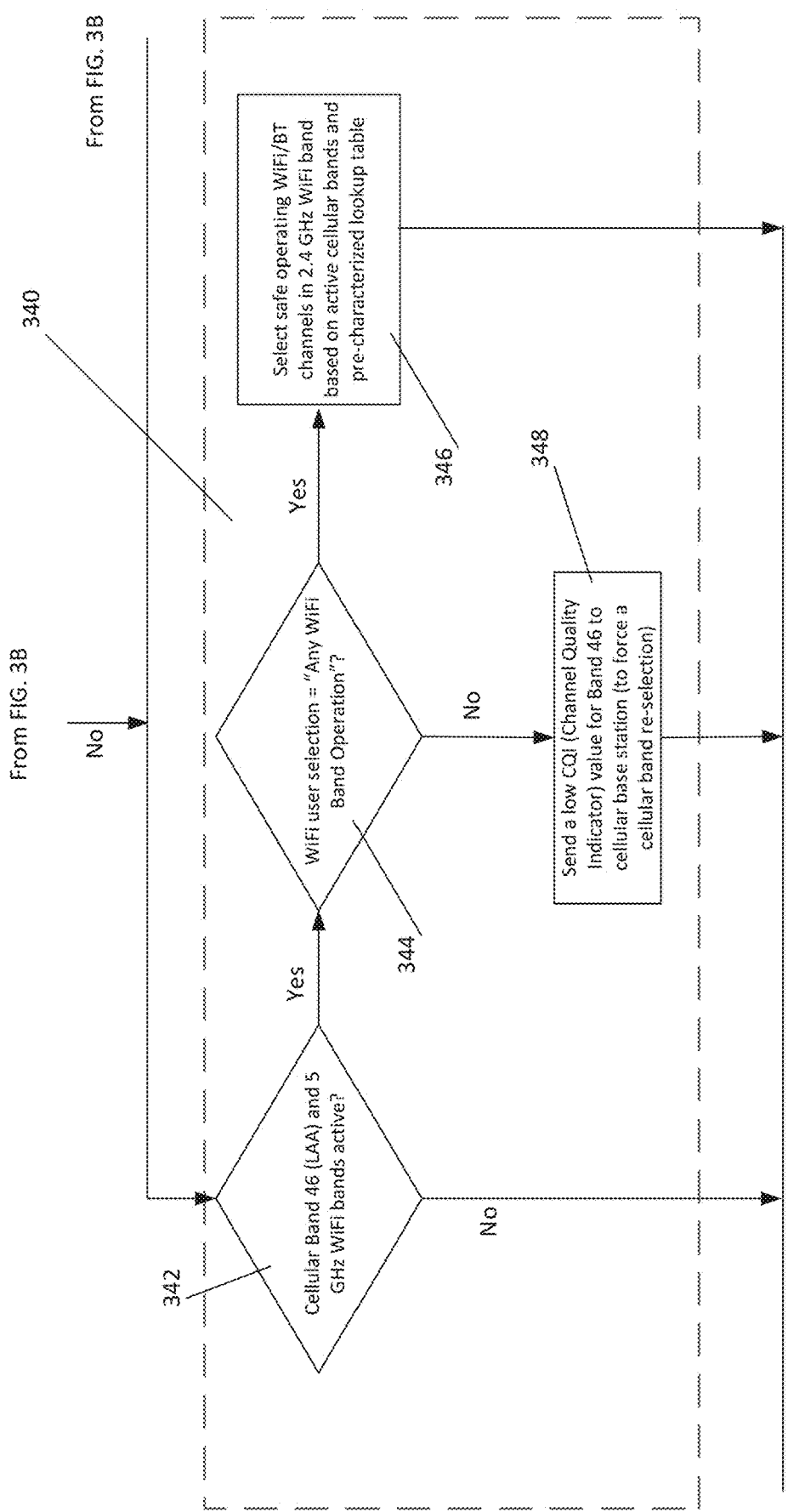

FIGS. 3A-3C illustrate an example of a flow diagram showing aspects from the multiple solutions to address aggressor/victim conflicts between wireless transmitters and receivers as described above with reference to FIGS. 2A-2D. As the example in FIG. 3 illustrates, the processes shown in FIGS. 2A-2D may be practiced alone or together with other mitigation processes in any suitable combination.

In process 310 shown in FIG. 3A, similar to the example in FIG. 2A, any change in cellular or WiFi channel, band, bandwidth, or transmit power level may trigger the coexistence operation flow (312). For an adjacent (or close frequency proximity) case (314) between the cellular and WiFi bands/channels, pre-characterized lookup tables are used to select safe WiFi and Bluetooth channels (316). These lookup tables may be developed based on platform level RF pre-characterization for such adjacent band cases since it inherently takes it account effects of higher order non-linearities through the various stages of the transmitter and receiver lineups, filter frequency responses, AGC (Automatic Gain Control) and power control strategies within these RX/TX lineups. When the transmit power exceeds a pre-defined transmit power threshold for a given aggressor-victim pair of bands/channels after compensating for cellular-WiFi antennas isolation and a hysteresis range, a lookup table based solution may be used to select safe WiFi and Bluetooth frequency ranges in the victim band(s). In the case that there are no safe frequencies in the victim band for a given adjacent bands case, an alternate WiFi band may be selected (based on user selection of the desired WiFi operating band).

In process 320 in FIG. 3B, If there is not an adjacent cellular-WiFi bands case, harmonic relationships between cellular and WiFi/Bluetooth channels are checked similar to the process illustrated in FIG. 2B. In the case where a 2nd or 3rd order harmonic of a cellular transmitter falls in a WiFi or Bluetooth victim channel or band, an analytical algorithm is used to compute unsafe WiFi and Bluetooth frequency ranges as a function of harmonic order, operating RF channel center frequencies, and aggressor/victim channel bandwidths (322). The computed unsafe frequency ranges are communicated to the WiFi and Bluetooth modems to ensure bands and channels are selected (326) by the indicated modems to avoid the indicated unsafe frequency ranges overlapping (324) WiFI/Bluetooth band(s).

In process 330 in FIG. 3B, an intermodulation check (similar to the process shown in FIG. 2C) may performed. If either a 2nd or 3rd order IMD (Intermodulation Distortion) product due to a combination of 2 cellular and/or WiFi transmitters falls in a victim cellular/WiFi receiver frequency range, an analytical algorithm is also used to compute unsafe WiFi and Bluetooth frequency ranges (332) based on the IMD order, operating RF channel center frequencies of the transmitters, and aggressor/victim channel bandwidths. The unsafe frequency ranges computed are then used to select safe WiFi and Bluetooth channels (336) to avoid receiver desensitization due to problematic harmonic and IMD cases indicated above with respect to the unsafe frequency ranges overlapping cellular/WiFi/Bluetooth bands (334).

In process 340 in FIG. 3C, a check performed (similar to the process shown in FIG. 2D) regarding whether cellular Band 46 (LAA) and 5 GHz WiFi band are requested to be concurrently active within the same operating band by the respective networks (342). In such a situation, if the WiFi user selection indicates that the WiFi modem can operate in any band (344), the WiFi modem is instructed to select 2.4 GHz WiFi band operation (346) to avoid concurrent operation with cellular LAA within the same operating band. Alternately, if the WiFi user selection is 5 GHz WiFi band only, the cellular modem is requested to send a low CQI (Channel Quality Indicator) metric for Band 46 (LAA) to the cellular base station (348). This in turn will cause the cellular base station to avoid use of the LAA band while the WiFi modem is operating in the 5 GHz WiFi band to avoid concurrent operation within the same band. Note that concurrent operation of cellular and WiFi within the same band cannot be allowed since the respective networks may schedule problematic operating channels (e.g., overlapping or directly adjacent channels) causing significant performance degradation within a victim receiver.

FIG. 4 illustrates a system (e.g., a smart device or a computer system or a System-on-Chip (SoC)), that may be used to implement one or more of the processes described herein (e.g., the processes in FIG. 2A-1, 2B, 2C, 2D, or 3A-3C) in accordance with some embodiments.

In some embodiments, device 400 represents an appropriate computing device, such as a computing tablet, a mobile phone or smart-phone, a laptop, a desktop, an Internet-of-Things (TOT) device, a server, a wearable device, a set-top box, a wireless-enabled e-reader, or the like. It will be understood that certain components are shown generally, and not all components of such a device are shown in device 400.

In an example, the device 400 comprises an SoC (System-on-Chip) 401. An example boundary of the SoC 401 is illustrated using dotted lines in FIG. 4, with some example components being illustrated to be included within SoC 401—however, SoC 401 may include any appropriate components of device 400.

In some embodiments, device 400 includes processor 404. Processor 404 can include one or more physical devices, such as microprocessors, application processors, microcontrollers, programmable logic devices, processing cores, or other processing means. The processing operations performed by processor 404 include the execution of an operating platform or operating system on which applications and/or device functions are executed. The processing operations include operations related to I/O (input/output) with a human user or with other devices, operations related to power management, operations related to connecting computing device 400 to another device, and/or the like. The processing operations may also include operations related to audio I/O and/or display I/O.

In some embodiments, processor 404 includes multiple processing cores (also referred to as cores) 408a, 408b, 408c. Although merely three cores 408a, 408b, 408c are illustrated in FIG. 4, processor 404 may include any other appropriate number of processing cores, e.g., tens, or even hundreds of processing cores. Processor cores 408a, 408b, 408c may be implemented on a single integrated circuit (IC) chip. Moreover, the chip may include one or more shared and/or private caches, buses or interconnections, graphics and/or memory controllers, or other components.

In some embodiments, processor 404 includes cache 406. In an example, sections of cache 406 may be dedicated to individual cores 408 (e.g., a first section of cache 406 dedicated to core 408a, a second section of cache 406 dedicated to core 408b, and so on). In an example, one or more sections of cache 406 may be shared among two or more of cores 408. Cache 406 may be split in different levels, e.g., level 1 (L1) cache, level 2 (L2) cache, level 3 (L3) cache, etc.

In some embodiments, processor core 404 may include a fetch unit to fetch instructions (including instructions with conditional branches) for execution by the core 404. The instructions may be fetched from any storage devices such as the memory 430. Processor core 404 may also include a decode unit to decode the fetched instruction. For example, the decode unit may decode the fetched instruction into a plurality of micro-operations. Processor core 404 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, execution unit may execute instructions out-of-order. Hence, processor core 404 may be an out-of-order processor core in one embodiment. Processor core 404 may also include a retirement unit. The retirement unit may retire executed instructions after they are committed. In an embodiment, retirement of the executed instructions may result in processor state being committed from the execution of the instructions, physical registers used by the instructions being de-allocated, etc. Processor core 404 may also include a bus unit to enable communication between components of processor core 404 and other components via one or more buses. Processor core 404 may also include one or more registers to store data accessed by various components of the core 404 (such as values related to assigned app priorities and/or sub-system states (modes) association.

In some embodiments, device 400 comprises connectivity circuitries 431. For example, connectivity circuitries 431 includes hardware devices (e.g., wireless and/or wired connectors and communication hardware) and/or software components (e.g., drivers, protocol stacks), e.g., to enable device 400 to communicate with external devices. Device 400 may be separate from the external devices, such as other computing devices, wireless access points or base stations, etc.

In an example, connectivity circuitries 431 may include multiple different types of connectivity. To generalize, the connectivity circuitries 431 may include cellular connectivity circuitries, wireless connectivity circuitries, etc. Cellular connectivity circuitries of connectivity circuitries 431 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 431 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 431 may include a network interface, such as a wired or wireless interface, e.g., so that a system embodiment may be incorporated into a wireless device, for example, a cell phone or personal digital assistant.

In some embodiments, device 400 comprises control hub 432, which represents hardware devices and/or software components related to interaction with one or more I/O devices. For example, processor 404 may communicate with one or more of display 422, one or more peripheral devices 424, storage devices 428, one or more other external devices 429, etc., via control hub 432. Control hub 432 may be a chipset, a Platform Control Hub (PCH), and/or the like.

For example, control hub 432 illustrates one or more connection points for additional devices that connect to device 400, e.g., through which a user might interact with the system. For example, devices (e.g., devices 429) that can be attached to device 400 include microphone devices, speaker or stereo systems, audio devices, video systems or other display devices, keyboard or keypad devices, or other I/O devices for use with specific applications such as card readers or other devices.

As mentioned above, control hub 432 can interact with audio devices, display 422, etc. For example, input through a microphone or other audio device can provide input or commands for one or more applications or functions of device 400. Additionally, audio output can be provided instead of, or in addition to display output. In another example, if display 422 includes a touch screen, display 422 also acts as an input device, which can be at least partially managed by control hub 432. There can also be additional buttons or switches on computing device 400 to provide I/O functions managed by control hub 432. In one embodiment, control hub 432 manages devices such as accelerometers, cameras, light sensors or other environmental sensors, or other hardware that can be included in device 400. The input can be part of direct user interaction, as well as providing environmental input to the system to influence its operations (such as filtering for noise, adjusting displays for brightness detection, applying a flash for a camera, or other features).

In some embodiments, control hub 432 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 422 represents hardware (e.g., display devices) and software (e.g., drivers) components that provide a visual and/or tactile display for a user to interact with device 400. Display 422 may include a display interface, a display screen, and/or hardware device used to provide a display to a user. In some embodiments, display 422 includes a touch screen (or touch pad) device that provides both output and input to a user. In an example, display 422 may communicate directly with the processor 404. Display 422 can be one or more of an internal display device, as in a mobile electronic device or a laptop device or an external display device attached via a display interface (e.g., DisplayPort, etc.). In one embodiment display 422 can be a head mounted display (HMD) such as a stereoscopic display device for use in virtual reality (VR) applications or augmented reality (AR) applications.

In some embodiments, and although not illustrated in the figure, in addition to (or instead of) processor 404, device 400 may include Graphics Processing Unit (GPU) comprising one or more graphics processing cores, which may control one or more aspects of displaying contents on display 422.

Control hub 432 (or platform controller hub) may include hardware interfaces and connectors, as well as software components (e.g., drivers, protocol stacks) to make peripheral connections, e.g., to peripheral devices 424.

It will be understood that device 400 could both be a peripheral device to other computing devices, as well as have peripheral devices connected to it. Device 400 may have a "docking" connector to connect to other computing devices for purposes such as managing (e.g., downloading and/or uploading, changing, synchronizing) content on device 400. Additionally, a docking connector can allow device 400 to connect to certain peripherals that allow computing device 400 to control content output, for example, to audiovisual or other systems.

In addition to a proprietary docking connector or other proprietary connection hardware, device 400 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 431 may be coupled to control hub 432, e.g., in addition to, or instead of, being coupled directly to the processor 404. In some embodiments, display 422 may be coupled to control hub 432, e.g., in addition to, or instead of, being coupled directly to processor 404.

In some embodiments, device 400 comprises memory 430 coupled to processor 404 via memory interface 434. Memory 430 includes memory devices for storing information in device 400.

In some embodiments, memory 430 can include nonvolatile (state does not change if power to the memory device is interrupted) and/or volatile (state is indeterminate if power to the memory device is interrupted) memory devices. Memory device 430 can be a dynamic random-access memory (DRAM) device, a static random-access memory (SRAM) device, flash memory device, phase-change memory device, or some other memory device having suitable performance to serve as process memory. In one embodiment, memory 430 can operate as system memory for device 400, to store data and instructions for use when the one or more processors 404 executes an application or process. Memory 430 can store application data, user data, music, photos, documents, or other data, as well as system data (whether long-term or temporary) related to the execution of the applications and functions of device 400.

Elements of various embodiments and examples are also provided as a machine-readable medium (e.g., memory 430) for storing the computer-executable instructions (e.g., instructions to implement any other processes discussed herein). The machine-readable medium (e.g., memory 430) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 400 comprises temperature measurement circuitries 440, e.g., for measuring temperature of various components of device 400. In an example, temperature measurement circuitries 440 may be embedded, or coupled or attached to various components, whose temperature are to be measured and monitored. For example, temperature measurement circuitries 440 may measure temperature of (or within) one or more of cores 408a, 408b, 408c, voltage regulator 414, memory 430, a mother-board of SoC 401, and/or any appropriate component of device 400.

In some embodiments, device 400 comprises power measurement circuitries 442, e.g., for measuring power consumed by one or more components of the device 400. In an example, in addition to, or instead of, measuring power, the power measurement circuitries 442 may measure voltage and/or current. In an example, the power measurement circuitries 442 may be embedded, or coupled or attached to various components, whose power, voltage, and/or current consumption are to be measured and monitored. For example, power measurement circuitries 442 may measure power, current and/or voltage supplied by one or more voltage regulators 414, power supplied to SoC 401, power supplied to device 400, power consumed by processor 404 (or any other component) of device 400, etc.

In some embodiments, device 400 comprises one or more voltage regulator circuitries, generally referred to as voltage regulator (VR) 414. VR 414 generates signals at appropriate voltage levels, which may be supplied to operate any appropriate components of the device 400. Merely as an example, VR 414 is illustrated to be supplying signals to processor 404 of device 400. In some embodiments, VR 414 receives one or more Voltage Identification (VID) signals, and generates the voltage signal at an appropriate level, based on the VID signals. Various type of VRs may be utilized for the VR 414. For example, VR 414 may include a "buck" VR, "boost" VR, a combination of buck and boost VRs, low dropout (LDO) regulators, switching DC-DC regulators, constant-on-time controller-based DC-DC regulator, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR, which is controlled by PCU 410a/b and/or PMIC 412. In some embodiments, each core has a network of distributed LDOs to provide efficient control for power management. The LDOs can be digital, analog, or a combination of digital or analog LDOs. In some embodiments, VR 414 includes current tracking apparatus to measure current through power supply rail(s).

In some embodiments, device 400 comprises one or more clock generator circuitries, generally referred to as clock generator 416. Clock generator 416 generates clock signals at appropriate frequency levels, which may be supplied to any appropriate components of device 400. Merely as an example, clock generator 416 is illustrated to be supplying clock signals to processor 404 of device 400. In some embodiments, clock generator 416 receives one or more Frequency Identification (FID) signals, and generates the clock signals at an appropriate frequency, based on the FID signals.

In some embodiments, device 400 comprises battery 418 supplying power to various components of device 400. Merely as an example, battery 418 is illustrated to be supplying power to processor 404. Although not illustrated in the figures, device 400 may comprise a charging circuitry, e.g., to recharge the battery, based on Alternating Current (AC) power supply received from an AC adapter.

In some embodiments, device 400 comprises Power Control Unit (PCU) 410 (also referred to as Power Management Unit (PMU), Power Controller, etc.). In an example, some sections of PCU 410 may be implemented by one or more processing cores 408, and these sections of PCU 410 are symbolically illustrated using a dotted box and labeled PCU 410a. In an example, some other sections of PCU 410 may be implemented outside the processing cores 408, and these sections of PCU 410 are symbolically illustrated using a dotted box and labeled as PCU 410b. PCU 410 may implement various power management operations for device 400. PCU 410 may include hardware interfaces, hardware circuitries, connectors, registers, etc., as well as software components (e.g., drivers, protocol stacks), to implement various power management operations for device 400.

In some embodiments, device 400 comprises Power Management Integrated Circuit (PMIC) 412, e.g., to implement various power management operations for device 400. In some embodiments, PMIC 412 is a Reconfigurable Power Management ICs (RPMICs) and/or an IMVP (Intel® Mobile Voltage Positioning). In an example, the PMIC is within an IC chip separate from processor 404. The may implement various power management operations for device 400. PMIC 412 may include hardware interfaces, hardware circuitries, connectors, registers, etc., as well as software components (e.g., drivers, protocol stacks), to implement various power management operations for device 400.

In an example, device 400 comprises one or both PCU 410 or PMIC 412. In an example, any one of PCU 410 or PMIC 412 may be absent in device 400, and hence, these components are illustrated using dotted lines.

Various power management operations of device 400 may be performed by PCU 410, by PMIC 412, or by a combination of PCU 410 and PMIC 412. For example, PCU 410 and/or PMIC 412 may select a power state (e.g., P-state) for various components of device 400. For example, PCU 410 and/or PMIC 412 may select a power state (e.g., in accordance with the ACPI (Advanced Configuration and Power Interface) specification) for various components of device 400. Merely as an example, PCU 410 and/or PMIC 412 may cause various components of the device 400 to transition to a sleep state, to an active state, to an appropriate C state (e.g., C0 state, or another appropriate C state, in accordance with the ACPI specification), etc. In an example, PCU 410 and/or PMIC 412 may control a voltage output by VR 414 and/or a frequency of a clock signal output by the clock generator, e.g., by outputting the VID signal and/or the FID signal, respectively. In an example, PCU 410 and/or PMIC 412 may control battery power usage, charging of battery 418, and features related to power saving operation.

The clock generator 416 can comprise a phase locked loop (PLL), frequency locked loop (FLL), or any suitable clock source. In some embodiments, each core of processor 404 has its own clock source. As such, each core can operate at a frequency independent of the frequency of operation of the other core. In some embodiments, PCU 410 and/or PMIC 412 performs adaptive or dynamic frequency scaling or adjustment. For example, clock frequency of a processor core can be increased if the core is not operating at its maximum power consumption threshold or limit. In some embodiments, PCU 410 and/or PMIC 412 determines the operating condition of each core of a processor, and opportunistically adjusts frequency and/or power supply voltage of that core without the core clocking source (e.g., PLL of that core) losing lock when the PCU 410 and/or PMIC 412 determines that the core is operating below a target performance level. For example, if a core is drawing current from a power supply rail less than a total current allocated for that core or processor 404, then PCU 410 and/or PMIC 412 can temporality increase the power draw for that core or processor 404 (e.g., by increasing clock frequency and/or power supply voltage level) so that the core or processor 404 can perform at higher performance level. As such, voltage and/or frequency can be increased temporality for processor 404 without violating product reliability.

In an example, PCU 410 and/or PMIC 412 may perform power management operations, e.g., based at least in part on receiving measurements from power measurement circuitries 442, temperature measurement circuitries 440, charge level of battery 418, and/or any other appropriate information that may be used for power management. To that end, PMIC 412 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor (s) may be directly coupled to PCU 410 and/or PMIC 412 in at least one embodiment to allow PCU 410 and/or PMIC 412 to manage processor core energy at least in part based on value(s) detected by one or more of the sensors.

Also illustrated is an example software stack of device 400 (although not all elements of the software stack are illustrated). Merely as an example, processors 404 may execute application programs 450, Operating System 452, one or more Power Management (PM) specific application programs (e.g., generically referred to as PM applications 458), and/or the like. PM applications 458 may also be executed by the PCU 410 and/or PMIC 412. OS 452 may also include one or more PM applications 456a, 456b, 456c. The OS 452 may also include various drivers 454a, 454b, 454c, etc., some of which may be specific for power management purposes. In some embodiments, device 400 may further comprise a Basic Input/output System (BIOS) 420. BIOS 420 may communicate with OS 452 (e.g., via one or more drivers 454), communicate with processors 404, etc.

For example, one or more of PM applications 458, 456, drivers 454, BIOS 420, etc. may be used to implement power management specific tasks, e.g., to control voltage and/or frequency of various components of device 400, to control wake-up state, sleep state, and/or any other appropriate power state of various components of device 400, control battery power usage, charging of the battery 418, features related to power saving operation, etc.

In some embodiments, pCode executing on PCU 410*a/b* has a capability to enable extra compute and telemetries resources for the runtime support of the pCode. Here pCode refers to a firmware executed by PCU 410*a/b* to manage performance of the SoC 401. For example, pCode may set frequencies and appropriate voltages for the processor. Part of the pCode are accessible via OS 452. In various embodiments, mechanisms and methods are provided that dynamically change an Energy Performance Preference (EPP) value based on workloads, user behavior, and/or system conditions. There may be a well-defined interface between OS 452 and the pCode. The interface may allow or facilitate the software configuration of several parameters and/or may provide hints to the pCode. As an example, an EPP parameter may inform a pCode algorithm as to whether performance or battery life is more important.

EXAMPLES

Some non-limiting Examples of various embodiments are presented below.

Example 1 includes an apparatus comprising: memory to store a system operating parameter; and processor circuitry, coupled with the memory, to: retrieve the system operating parameter from the memory, the system operating parameter including a parameter associated with a communication by the apparatus in a cellular band concurrent to a communication by the apparatus in a wireless communication format using a band adjacent to the cellular band; determine that a transmit power level associated with the communication in the cellular band, or a transmit power level associated with the communication in the wireless communication format, exceeds a predetermined threshold; and select, based on the system operating parameter and the determination that the transmit power level exceeds the predetermined threshold, a band and channel for the communication in the wireless communication format that avoids interference with the communication in the cellular band.

Example 2 includes the apparatus of example 1 or some other example herein, wherein the processor circuitry is further to encode a message for transmission in the wireless communication format using the selected band and channel.

Example 3 includes the apparatus of example 1 or some other example herein, wherein the wireless communication format includes: Bluetooth, Bluetooth low energy (BLE), radio frequency identification (RFID), Wi-Fi, ZigBee, or Z-Wave.

Example 4 includes the apparatus of example 1 or some other example herein, wherein the system operating parameter includes a user selection of the band adjacent to the cellular band for the wireless communication format.

Example 5 includes the apparatus of example 1 or some other example herein, wherein the system operating parameter includes a high-power user equipment (HPUE) mode selection.

Example 6 includes the apparatus of example 1 or some other example herein, wherein the system operating parameter includes a bulk acoustic wave (BAW) or non-BAW indicator.

Example 7 includes the apparatus of example 1 or some other example herein, wherein the system operating parameter includes an indication of a center frequency for an operating channel or a channel bandwidth.

Example 8 includes the apparatus of example 1 or some other example herein, wherein the determination that the transmit power level exceeds the predetermined threshold is based on one or more of: a moving average over an averaging period associated with the transmit power level, antenna isolation information associated with the transmit power level, or a hysteresis range associated with the transmit power level.

Example 9 includes one or more non-transitory computer-readable media storing instructions that, when executed by one or more processors, cause a computing device to: determine a harmonic center frequency for a cellular transmit carrier; determine, based on the harmonic center frequency, an unsafe frequency range in which there is conflict between a communication by the computing device in a cellular band concurrent to a communication by the computing device in a wireless communication format; and map the unsafe frequency range to corresponding channels associated with the wireless communication format to mark the corresponding channels as unusable for the communication in the wireless communication format.

Example 10 includes the one or more non-transitory computer-readable media of example 9 or some other example herein, wherein the cellular transmit carrier is a first cellular transmit carrier and the harmonic center frequency is a first harmonic center frequency, and wherein the media further stores instructions to: determine a second harmonic center frequency for a second cellular transmit carrier; and determine the unsafe frequency range based on the first harmonic center frequency and the second harmonic center frequency.

Example 11 includes the one or more non-transitory computer-readable media of example 9 or some other example herein, wherein the media further stores instructions to encode a message for transmission in the wireless communication format using a channel that is not marked unusable.

Example 12 includes the one or more non-transitory computer-readable media of example 9 or some other example herein, wherein the wireless communication format includes: Bluetooth, Bluetooth low energy (BLE), radio frequency identification (RFID), Wi-Fi, ZigBee, or Z-Wave.

Example 13 includes the one or more non-transitory computer-readable media of example 9 or some other example herein, wherein the harmonic center frequency is associated with a second-order harmonic or a third-order harmonic.

Example 14 includes the one or more non-transitory computer-readable media of example 9 or some other example herein, wherein to determine the unsafe frequency range is based on a modulation bandwidth and a channel bandwidth associated with the cellular transmit carrier.

Example 15 includes one or more non-transitory computer-readable media storing instructions that, when executed by one or more processors, are to cause a computing device to: determine a plurality of center frequencies for a plurality of cellular transmit carriers or a plurality of carriers for a wireless communication format; determine, based on the plurality of center frequencies, an unsafe frequency range in which there is conflict between a communication by the computing device in a cellular band concurrent to a communication by the computing device in the wireless communication format; in the event that the unsafe frequency range overlaps with the cellular band, communicate using the wireless communication format in a channel that is at least two channels away from an active channel frequency of the cellular band; and in the event that the unsafe frequency range overlaps with a band used for the communication in the wireless communication format, map the unsafe frequency range to corresponding channels associated with the wireless communication format to mark the corresponding channels as unusable for the communication in the wireless communication format.

Example 16 includes the one or more non-transitory computer-readable media of example 15 or some other example herein, wherein the media further stores instructions to encode a message for transmission in the wireless communication format using a channel that is not marked unusable.

Example 17 includes the one or more non-transitory computer-readable media of example 15 or some other example herein, wherein the wireless communication format includes: Bluetooth, Bluetooth low energy (BLE), radio frequency identification (RFID), Wi-Fi, ZigBee, or Z-Wave.

Example 18 includes the one or more non-transitory computer-readable media of example 15 or some other example herein, wherein to determine the unsafe frequency range is based on a modulation bandwidth and a channel bandwidth associated with the cellular transmit carrier.

Example 19 includes the one or more non-transitory computer-readable media of example 15 or some other example herein, wherein to determine the unsafe frequency range is based on an intermodulation product order.

Example 20 includes one or more non-transitory computer-readable media storing instructions that, when executed by one or more processors, are to cause a computing device to: receive, from a network, a request to for the computing device to perform a communication in a cellular band concurrent to performing a communication, by the computing device, in a wireless communication format, wherein the communication in the wireless communication format is to be performed within the cellular band; and in response to receiving the request, either: select, based on the cellular band, a channel for the communication in the wireless communication format that is outside the cellular band; or encode a low channel quality indicator (CQI) message for transmission to a next-generation NodeB (gNB) to force a cellular band reselection.

Example 21 includes the one or more non-transitory computer-readable media of example 20 or some other example herein, wherein the cellular band is a license assisted access (LAA) cellular band.

Example 22 includes the one or more non-transitory computer-readable media of example 21 or some other example herein, wherein LAA cellular band is cellular band 46.

Example 23 includes the one or more non-transitory computer-readable media of example 20 or some other example herein, wherein the channel outside the cellular band is a channel within a 2.4 GHz band.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

What is claimed is:

1. An apparatus comprising:
   memory to store a system operating parameter; and
   processor circuitry, coupled with the memory, to:
      retrieve the system operating parameter from the memory, the system operating parameter including a parameter associated with a communication by the apparatus in a cellular band concurrent to a communication by the apparatus in a wireless communication format using a band adjacent to the cellular band;
      determine that a transmit power level associated with the communication in the cellular band, or a transmit power level associated with the communication in the wireless communication format, exceeds a predetermined threshold; and
      select, based on the system operating parameter and the determination that the transmit power level exceeds the predetermined threshold, a band and a channel for the communication in the wireless communication format that avoids interference with the communication in the cellular band, wherein the system operating parameter includes a high-power user equipment (HPUE) mode selection or a bulk acoustic wave (BAW) or non-BAW indicator.

2. The apparatus of claim 1, wherein the processor circuitry is further to encode a message for transmission in the wireless communication format using the selected band and channel.

3. The apparatus of claim 1, wherein the wireless communication format includes: Bluetooth, Bluetooth low energy (BLE), radio frequency identification (RFID), Wi-Fi, ZigBee, or Z-Wave.

4. The apparatus of claim 1, wherein the system operating parameter includes a user selection of the band adjacent to the cellular band for the wireless communication format.

5. The apparatus of claim 1, wherein the system operating parameter includes an indication of a center frequency for an operating channel or a channel bandwidth.

6. The apparatus of claim 1, wherein the determination that the transmit power level exceeds the predetermined threshold is based on one or more of: a moving average over an averaging period associated with the transmit power level, antenna isolation information associated with the transmit power level, or a hysteresis range associated with the transmit power level.

* * * * *